US012691383B2

(12) United States Patent
Noimark et al.

(10) Patent No.: US 12,691,383 B2
(45) Date of Patent: ***Jul. 28, 2026

(54) SPECTATOR SYSTEM IN ONLINE GAMES

(71) Applicant: Electronic Arts Inc., Redwood City, CA (US)

(72) Inventors: Yuval Noimark, Binyamina (IL); Jeffrey E. Skelton, West Kelowna (CA); Henrik Karlsson, North Vancouver (CA); Eneko Bilbao, North Vancouver (CA)

(73) Assignee: Electronic Arts Inc., Redwood City, CA (US)

( * ) Notice: Subject to any disclaimer, the term of this patent is extended or adjusted under 35 U.S.C. 154(b) by 88 days.

This patent is subject to a terminal disclaimer.

(21) Appl. No.: 18/672,831

(22) Filed: May 23, 2024

(65) Prior Publication Data

US 2024/0307789 A1 Sep. 19, 2024

Related U.S. Application Data

(63) Continuation of application No. 17/446,745, filed on Sep. 2, 2021, now Pat. No. 12,029,988.

(51) Int. Cl.
*A63F 13/86* (2014.01)
*A63F 13/35* (2014.01)
*A63F 13/352* (2014.01)
(52) U.S. Cl.
CPC .............. *A63F 13/86* (2014.09); *A63F 13/35* (2014.09); *A63F 13/352* (2014.09)

(58) Field of Classification Search
None
See application file for complete search history.

(56) References Cited

U.S. PATENT DOCUMENTS

| | | | |
|---|---|---|---|
| 11,925,861 B2 * | 3/2024 | Noimark | A63F 13/86 |
| 12,029,988 B2 * | 7/2024 | Noimark | A63F 13/795 |
| 2003/0038805 A1 | 2/2003 | wong | |
| 2006/0058103 A1 | 3/2006 | Danieli et al. | |
| 2007/0117617 A1 * | 5/2007 | Spanton | A63F 13/12 |
| | | | 463/40 |
| 2013/0123019 A1 | 5/2013 | Sullivan et al. | |
| 2015/0251095 A1 | 9/2015 | Perrin | |
| 2017/0006322 A1 | 1/2017 | Dury | |
| 2017/0039765 A1 | 2/2017 | Zhou | |
| 2018/0133603 A1 | 5/2018 | Ninoles et al. | |

(Continued)

OTHER PUBLICATIONS

Office Action for U.S. Appl. No. 17/446,745, mailed on Apr. 7, 2023, Inventor #1 Yuval Noimark, "Spectator System in Online Games," 7 pages.

(Continued)

*Primary Examiner* — Damon J Pierce
(74) *Attorney, Agent, or Firm* — Lee & Hayes, P.C.

(57) ABSTRACT

A spectator system may provide for spectating in online gaming. The spectator system may receive, at a spectator server, game state data from a game simulation server hosting an online game for one or more players, generate one or more spectator game state data corresponding to one or more spectator devices and output the one or more spectator game state data to the spectator devices. The spectator server may further output the game state data to another spectator server.

20 Claims, 10 Drawing Sheets

(56) References Cited

U.S. PATENT DOCUMENTS

| | | | |
|---|---|---|---|
| 2019/0118086 A1 | 4/2019 | Gentile et al. | |
| 2019/0314728 A1 | 10/2019 | Sullivan et al. | |
| 2021/0304504 A1 | 9/2021 | Parr | |
| 2023/0063652 A1 | 3/2023 | Noimark | |
| 2023/0065298 A1 | 3/2023 | Noimark | |

OTHER PUBLICATIONS

Office Action for U.S. Appl. No. 17/446,745, mailed on Aug. 23, 2023, Noimark, "Spectator System in Online Games", 7 pgs.
Office Action for related U.S. Appl. No. 17/446,747, mailed Apr. 27, 2023, Yuval Noimark, "System for Multiview Games Experience" (8 pages).
Office Action for U.S. Appl. No. 17/446,745, mailed on Nov. 7, 2022, Yuval Noimark, "Spectator System in Online Games", 7 pages.
Office Action for U.S. Appl. No. 17/446,747, mailed on 120/7/2022, Noimark, "A System for Multiview Games Experience", 7 pages.
Office Action for U.S. Appl. No. 17/446,747, mailed on Jun. 29, 2022, Noimark, "A System for Multiview Games Experience", 9 Pages.

* cited by examiner

600

INITIATE GAME FOR ONE OR MORE PLAYERS
602

INITIALIZE GAME ENGINE
604

INITIALIZE SPECTATOR SYSTEM
606

ESTABLISH CONNECTION TO GAME CLIENTS OF PLAYERS
608

RECEIVE PLAYER INPUT
610

UPDATE GAME STATE
612

GENERATE GAME CLIENT DATA FOR PLAYERS
614

OUTPUT GAME CLIENT DATA TO PLAYER DEVICES
616

OUTPUT FULL GAME STATE TO SPECTATOR SYSTEM
618

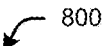
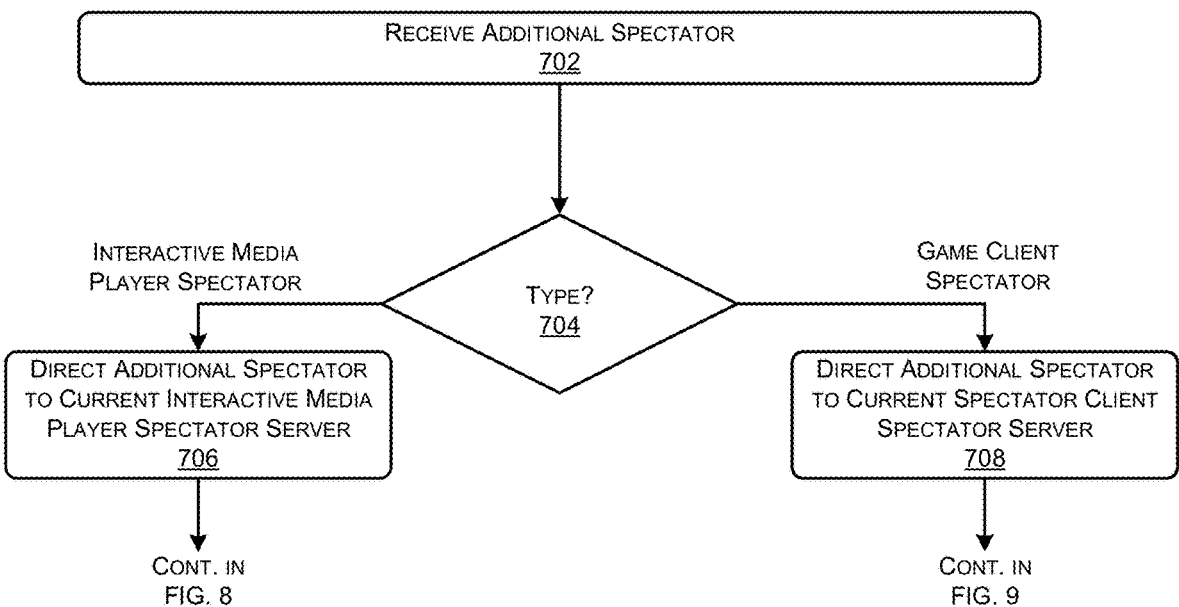
FIG. 7

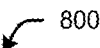
800

FROM
FIG. 7 OR 822

REMAINING
SLOTS AVAILABLE ON
CURRENT INTERACTIVE MEDIA
SPECTATOR SERVER?
802

YES

NO

ESTABLISH CONNECTION WITH
ADDITIONAL SPECTATOR 804

INITIALIZE RENDERER THREAD FOR
SPECTATOR VIEW 808

GENERATE MEDIA STREAM OF
SPECTATOR VIEW 810

OUTPUT MEDIA STREAM OF
SPECTATOR VIEW 812

RECEIVE FULL GAME STATE
UPDATE FROM GAME ENGINE/
SERVER 814

RECEIVE INPUT FROM ADDITIONAL
SPECTATOR 816

UPDATE SPECTATOR VIEW BASED
ON INPUT 818

ESTABLISH ADDITIONAL INTERACTIVE MEDIA
SPECTATOR SERVER
806

REBROADCAST FULL GAME STATE TO
ADDITIONAL INTERACTIVE MEDIA
SPECTATOR SERVER
820

REDIRECT ADDITIONAL SPECTATOR TO
ADDITIONAL INTERACTIVE MEDIA
SPECTATOR SERVER
822

FIG. 8

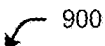

FROM
FIG. 7 OR 918

REMAINING
SLOTS AVAILABLE ON
CURRENT SPECTATOR CLIENT
SPECTATOR SERVER?
902

YES

NO

ESTABLISH CONNECTION WITH
ADDITIONAL SPECTATOR
904

ESTABLISH ADDITIONAL SPECTATOR CLIENT
SPECTATOR SERVER
906

RECEIVE SPECTATOR STATE FROM
ADDITIONAL SPECTATOR
908

REBROADCAST FULL GAME STATE FROM
CURRENT SERVER TO ADDITIONAL
SPECTATOR CLIENT SPECTATOR SERVER
916

GENERATE SPECTATOR CLIENT
GAME STATE DATA FOR
ADDITIONAL SPECTATOR
910

REDIRECT ADDITIONAL SPECTATOR TO
ADDITIONAL SPECTATOR CLIENT
SPECTATOR SERVER 918

OUTPUT SPECTATOR CLIENT
GAME STATE DATA FOR
ADDITIONAL SPECTATOR
912

RECEIVE FULL GAME STATE
UPDATE FROM GAME ENGINE/
SERVER 914

FIG. 9

SPECTATOR SYSTEM IN ONLINE GAMES

CROSS-REFERENCE TO RELATED APPLICATION

This application is a continuation of and claims priority to U.S. application Ser. No. 17/446,745, filed on Sep. 2, 2021, and entitled "SPECTATOR SYSTEM IN ONLINE GAMES," the entirety of which is incorporated herein by reference.

BACKGROUND

Online gaming allows for players to play a variety of electronic and/or video games with each other via network connectivity, such as via the Internet. With eSports and general game spectating, games are becoming more than just a playing experience. Frustration may arise due to limitations on numbers of spectators that can be accommodated and a lack of options for spectating games, for example, on devices that may not be powerful enough to perform rendering.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 7 illustrates a flow diagram of an example method that may provide for accommodating spectators in online gaming, in accordance with example embodiments of the disclosure.

FIG. 8 illustrates a flow diagram of an example method that may provide for accommodating spectators using an spectator media player to spectate in online gaming, in accordance with example embodiments of the disclosure.

FIG. 9 illustrates a flow diagram of an example method that may provide for accommodating spectators using a spectator client to spectate in online gaming, in accordance with example embodiments of the disclosure.

DETAILED DESCRIPTION

Figure 1:
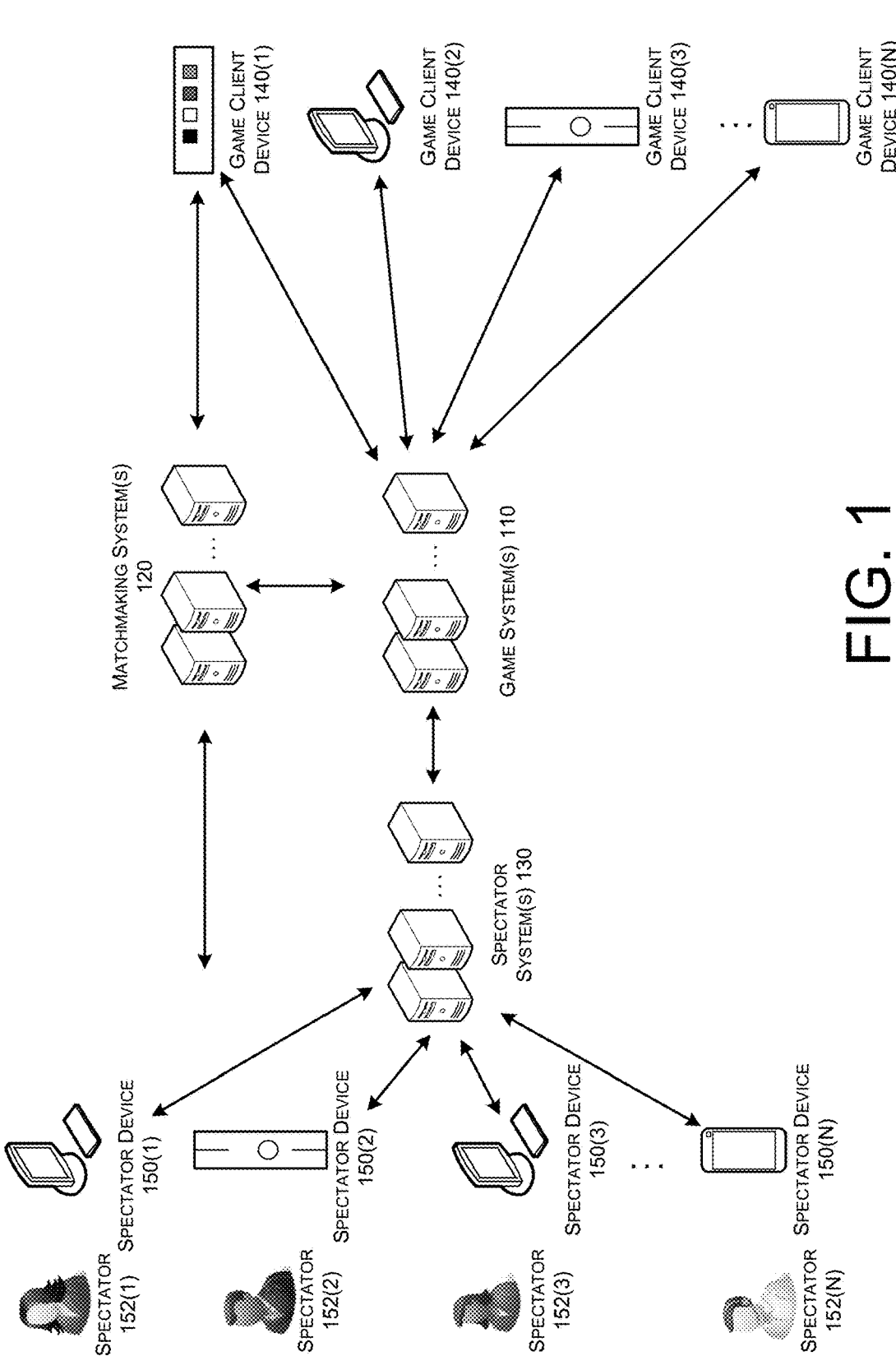
FIG. 1 illustrates a schematic diagram of an example environment with gaming system(s) and spectator system(s) that may accommodate spectators in online gaming, in accordance with example embodiments of the disclosure.

Example embodiments of this disclosure describe methods, apparatuses, computer-readable media, and system(s) for accommodating spectators in online gaming. In some examples, methods, apparatuses, computer-readable media, and system(s) according to this disclosure may accommodate an arbitrary number of online game spectators. Some examples may include a rebroadcast architecture that may instantiate additional spectator node(s) or server(s) to accommodate additional spectators. For example, when a current spectator node or server has reached a spectator capacity, an additional spectator node or server may be instantiated and a rebroadcast of the game state may be established between a previously established spectator node or server and the newly instantiated spectator node or server.

Additionally or alternatively, some examples may provide interactive spectating options in addition to or as an alternative to the use of a game or game spectator specific client (e.g., that renders the spectator view), hereinafter spectator client, to spectate. Some examples may include a split game engine architecture that may provide for separation of at least a portion of the game simulation functionality of the game engine from the rendering functionality of the game engine. For example, one or more processors may execute the game simulation functionality and one or more other processors may execute the rendering functionality. In particular examples, one or more processors of a first computing device may execute the game simulation functionality and one or more processors of one or more second computing devices may execute the rendering functionality. More particularly, for a plurality of spectators, a plurality of respective rendering threads may be instantiated on the second computing device(s). A plurality of rendering threads may share a CPU and/or GPU using time slicing. Additionality or alternatively, the rendering threads may operate on corresponding CPUs and/or GPUs. The game simulation functionality may provide the rendering functionality (e.g., the rendering threads and/or second computing devices) with a state stream of the game state (e.g., which may be the entire game state of the simulation). A rendering thread may also receive spectator input from the corresponding spectator of the rendering thread. Using the spectator input of the corresponding spectator and the state stream of the game state, the rendering thread may render and output an interactive spectator view as a rendered media stream to a spectator device of the corresponding spectator (e.g., a web browser including a media player functionality that is operating on a user device of the spectator).

Examples are not limited to spectator views driven by spectator input from the individual spectator. For example, a spectator may desire to view a live stream of a player in the game. The streaming player may request the online game system establish a spectator stream for the streaming player which may be rendered by the online gaming system for viewing by fans or viewers of the streaming player. In such an example, a spectator server may establish a state stream between the streaming player and the spectator server. The state stream from the streaming player may be utilized with the game state from the game simulation functionality to generate a media stream corresponding to the streaming player that may be provided to fans or viewers of the streaming player. The spectator server may also provide for configuration of the presentation of the media stream (e.g., visual or audio additions to the media stream). Such a media stream from the online gaming system may be viewed as more official than a media stream generated at the streaming player's computing device and may provide reduced burden on the streaming player to produce streaming gameplay media for viewers.

Some examples may include a rebroadcast architecture that provides spectating options that include both spectator client spectating and media player streaming spectating (e.g., which may include one or both of interactive spectating and/or streaming player based spectating).

Further, by expanding the number of spectators and/or spectator viewpoints that can be accommodated for online games, examples according to this disclosure may also provide more immersive experiences for spectators, such as voice communications among spectators. For example, for a sports game, examples according to this disclosure may facilitate simulated physical viewing of the sports game. For example, in a championship match of an esports game based on a physical sport (e.g., soccer), spectators may be able to purchase or otherwise be assigned seats within a virtual stadium set around the gameplay area. For a particular spectator, the spectator system may create ambient voices or allow for conversations among nearby spectators using microphone data for other spectators located in virtual seats proximate the particular spectator.

As described in further detailed below, the systems and methods described herein are presented for exemplary and illustrative purposes; they are not indicative of applicant's product or implementation plans. Moreover, it should be understood that any reference herein to the use of player or user data would be in compliance with privacy policies that respect players' privacy, and in accordance with player privacy settings or preferences.

Certain implementations and embodiments of the disclosure will now be described more fully below with reference to the accompanying figures, in which various aspects are shown. However, the various aspects may be implemented in many different forms and should not be construed as limited to the implementations set forth herein. For example, some examples provided herein relate to sport, fighting or shooting games. Implementations are not limited to the example genres. It will be appreciated that the disclosure encompasses variations of the embodiments, as described herein. Like numbers refer to like elements throughout.

FIG. 1 illustrates a schematic diagram of an example environment 100 with game system(s) 110, matchmaking system(s) 120, spectator system(s) 130, game client device(s) 140, and spectator device(s) 150 that may accommodate spectators in online gaming, in accordance with example embodiments of the disclosure.

The example environment 100 may include one or more player(s) 142(1), 142(2), 142(3), . . . 142(N), hereinafter referred to individually or collectively as player(s) 142, who may interact with respective game client device(s) 140(1), 140(2), 140(3), . . . 140(N), hereinafter referred to individually or collectively as game client device(s) 140 via respective input device(s).

The game client device(s) 140 may receive game state information from the one or more game system(s) 110 that may host the online game played by the player(s) 142 of environment 100. The game state information may be received repeatedly and/or continuously and/or as events of the online game transpire. The game state information may be based at least in part on the interactions that each of the player(s) 142 have in response to events of the online game hosted by the game system(s) 110.

The game client device(s) 140 may be configured to render content associated with the online game to respective player(s) 142 based at least on the game state information. More particularly, the game client device(s) 140 may use the most recent game state information to render current events of the online game as content. This content may include video, audio, haptic, combinations thereof, or the like content components.

As events transpire in the online game, the game system(s) 110 may update game state information and send that game state information to the game client device(s) 140. For example, if the player(s) 142 are playing an online soccer game, and the player 142 playing one of the goalies moves in a particular direction, then that movement and/or goalie location may be represented in the game state information that may be sent to each of the game client device(s) 140 for rendering the event of the goalie moving in the particular direction. In this way, the content of the online game is repeatedly updated throughout game play. Further, the game state information sent to individual game client device(s) 140 may be a subset or derivative of the full game state maintained at the game system(s) 110. For example, in a team deathmatch game, the game state information provided to a game client device 140 of a player may be a subset or derivative of the full game state generated based on the location of the player in the game simulation.

When the game client device(s) 140 receive the game state information from the game system(s) 110, a game client device 140 may render updated content associated with the online game to its respective player 142. This updated content may embody events that may have transpired since the previous state of the game (e.g., the movement of the goalie).

The game client device(s) 140 may accept input from respective player(s) 142 via respective input device(s). The input from the player(s) 142 may be responsive to events in the online game. For example, in an online basketball game, if a player 142 sees an event in the rendered content, such as an opposing team's guard blocking the point, the player 142 may use his/her input device to try to shoot a three-pointer. The intended action by the player 142, as captured via his/her input device, may be received by the game client device 140 and sent to the game system(s) 110.

The game client device(s) 140 may be any suitable device, including, but not limited to a Sony Playstation® line of systems, a Nintendo Switch® line of systems, a Microsoft Xbox® line of systems, any gaming device manufactured by Sony, Microsoft, Nintendo, or Sega, an Intel-Architecture (IA)® based system, an Apple Macintosh® system, a netbook computer, a notebook computer, a desktop computer system, a set-top box system, a handheld system, a smartphone, a personal digital assistant, combinations thereof, or the like. In general, the game client device(s) 140 may execute programs thereon to interact with the game system(s) 110 and render game content based at least in part on game state information received from the game system(s) 110. Additionally, the game client device(s) 140 may send indications of player input to the game system(s) 110. Game state information and player input information may be shared between the game client device(s) 140 and the game system(s) 110 using any suitable mechanism, such as application program interfaces (APIs).

The game system(s) 110 may receive inputs from various player(s) 142 and update the state of the online game based thereon. As the state of the online game is updated, the state may be sent to the game client device(s) 140 for rendering online game content to player(s) 142. In this way, the game system(s) 110 may host the online game.

The example environment 100 may further include matchmaking system(s) 120 to match player(s) 142 who wish to play the same game and/or game mode with each other and to provide a platform for communication between the player(s) 142 playing online games (e.g., the same game and/or different games). The matchmaking system(s) 120 may receive an indication from the game system(s) 110 of player(s) 142 who wish to play an online game.

The matchmaking system(s) 120 may attempt matchmaking between player(s) 142. The matchmaking system(s) 120 may access information about the player(s) 142 who wish to play a particular online game, such as from a player datastore. A user account for each of the player(s) 142 may associate various information about the respective player(s) 142 and may be stored in the player datastore and accessed by the matchmaking system(s) 120.

Player(s) 142 may be matched according to one or more metrics associated with the player(s) 142 such as skill at a particular game. In addition to or alternatively to skill scores, player(s) 142 may be matched on a variety of other factors. Some example matchmaking factors may be related to behavior in addition to skill and may include a player's playstyle. For example, when matching player(s) 142 as a team for a team deathmatch, the matchmaking system(s) 120 may favor matching player(s) 142 that exhibit similar levels of aggression or a mix of levels of aggression. This may alleviate the frustration experienced by players when deathmatch teams split up due to different players utilizing different tactics. Splitting a deathmatch team into different groups using different tactics can often result in a loss to an opposing team operating as a single unit with a shared tactical approach. The aspects of players' playstyle utilized for different genres or different individual games may vary from example to example.

Some other example matchmaking factors may be character or setup related such as character class, team choice, position or role preference, and so on. For example, when matching player(s) 142 for an online roleplaying game, the matchmaking system(s) 120 may consider the character classes of the player(s) 142. Other matchmaking factors may be related to teammates or teams of the player(s) 142. In an example, the matchmaking may match a player 142 to other players the player 142 plays with regularly.

Having matched the player(s) 142, the matchmaking system(s) 120 may instruct generation of instance(s) of the online game(s) for the match(es). More particularly, the matchmaking system(s) 120 may request the game system(s) 110 instantiate an online game between the matched player(s) 142. For example, the matchmaking system(s) 120 may provide connection information for the game client device(s) 140 to the game system(s) 110 for instantiation of an instance of the online game between the matched player(s) 142. As discussed herein, instances and matches of an online game may be used interchangeably and may refer to a shared gameplay environment in which matched players play in the online game, whether a single map, multiple connected maps, or a gameplay world. In some examples, a server may host the match or instance of the game for the matched players.

As a player 142 engages in additional gameplay, the gaming system(s) 110 may provide the matchmaking system(s) 120 with some or all of the game state information. The matchmaking system(s) 120 may store the game state information or data derived from the game state information. In this manner, behavior data and/or gameplay history for the player 142 may remain up-to-date, even if or as the player's behaviors and playstyle evolve over time.

As mentioned above, the matchmaking system(s) 120 may further provide a platform for communication between the player(s) 142 playing online games (e.g., the same game and/or different games). Depending on the implementation, the matchmaking system(s) 120 may provide a social platform in which player(s) 142 may utilize friends list, communities and/or groups, and other connections to establish relationships with other player(s) 142. The matchmaking system(s) 120 may also provide direct messaging, group messaging, public messaging, chat, and/or other communications functionality to allow player(s) 142 to communicate via the social platform.

In addition, the matchmaking system(s) 120 (or the game system(s) 110) may include in-match communications functionality that may allow player(s) 142 to communicate with other player(s) 142 while in matches or instances of the online game.

The example environment 100 may include one or more spectator(s) 152(1), 152(2), 152(3), . . . 152(N), hereinafter referred to individually or collectively as spectator(s) 152, who may interact with respective spectator device(s) 150(1), 150(2), 150(3), . . . 150(N), hereinafter referred to individually or collectively as spectator device(s) 150 via respective input device(s).

Spectator system(s) 130 may receive game state information (e.g., for the full game state) from the game system(s) 110 and operate in conjunction with the spectator devices 150 to allow the spectator(s) 152 to spectate the online game. While examples herein discuss the full game state being received from the gaming system(s) 11, in some examples, the spectator system(s) 130 may receive updates to the full game state such that the full game state is available at the spectator system(s) throughout an online game. In general, spectator system(s) 130 may provide support for one or more types of spectator setups which may be based on the functionality provided by the individual spectator device(s) 150. In some spectator setups, the spectators device(s) 150 may include a spectator client that is capable of rendering the view for the spectator and providing spectator input to the spectator system(s) 130. In addition or alternatively, in some spectator setups, the spectator device(s) 150 may include a streaming media player that is capable all receiving and presenting to the spectator a view rendered at the spectator system(s) 130 as a media stream and may provide spectator input to the spectator system(s) 130. Additional detail of these example spectator setups is provided below.

In spectator setups involving spectator device(s) 150 that include a spectator client that is capable of rendering the view for the spectator, the spectator device(s) 150 may receive game state information from the one or more spectator system(s) 130 in a similar manner to that discussed above for the game client device(s) 140 receiving game state information from the game system(s) 110. The game state information may be received repeatedly and/or continuously and/or as events of the online game transpire.

The spectator client operating on the spectator device(s) 150 may be configured to render content associated with the online game to respective spectator(s) 152 based at least on the game state information. More particularly, the spectator device(s) 150 may use the most recent game state information to render current events of the online game as content. This content may include video, audio, haptic, combinations thereof, or the like content components.

As events transpire in the online game, the spectator system(s) 130 may receive updated game state information from the game system(s) 110 and send that game state information to the spectator device(s) 150. For example, if the spectator(s) 152 are spectating an online soccer game, and a player playing one of the goalies moves in a particular direction, then that movement and/or goalie location may be represented in the game state information that may be sent to each of the spectator device(s) 150 for rendering the event of the goalie moving in the particular direction. In this way, the content of the online game is repeatedly updated throughout game play. Further, the game state information sent to individual spectator device(s) 150 may be a subset or derivative of the full game state received by the spectator system(s) 130 from the game system(s) 110. For example, in a team deathmatch game, the game state information provided to a spectator device 150 of a spectator may be a subset or derivative of the full game state generated based on the location of the spectator's viewpoint in the game simulation.

When the spectator device(s) 150 receive the game state information from the spectator system(s) 130, a spectator device 150 may render updated content associated with the online game to its respective spectator 152. This updated content may embody events that may have transpired since the previous state of the game (e.g., the movement of the goalie).

The spectator device(s) 150 may accept input from respective spectator(s) 152 via respective input device(s). The input from a spectator 152 may relate to the viewpoint or rendered view of the spectator and/or be responsive to events in the online game. For example, in an online basketball game, if a spectator 152 sees an event in the rendered content, such as a player trying to shoot a three-pointer, the spectator 152 may desire to move the spectator's viewpoint back to allow the spectator to see the player and the goal. The intended change in viewpoint from the spectator 152, as captured via his/her input device, may be received by the spectator device 150 and utilized by the spectator device to change the view being rendered in accordance with the spectator's input. In some examples, the spectator device 150 may send the change in the spectator's view to the spectator system(s) 130 to allow the spectator system(s) 130 provide appropriate game state information for the spectator.

The spectator device(s) 150 may be any suitable device, including, but not limited to a Sony Playstation® line of systems, a Nintendo Switch® line of systems, a Microsoft Xbox® line of systems, any gaming device manufactured by Sony, Microsoft, Nintendo, or Sega, an Intel-Architecture (IA)® based system, an Apple Macintosh® system, a netbook computer, a notebook computer, a desktop computer system, a set-top box system, a handheld system, a smartphone, a personal digital assistant, combinations thereof, or the like. In general, the spectator device(s) 150 may execute programs (e.g., spectator clients) thereon to interact with the spectator system(s) 130 and render game content based at least in part on game state information received from the spectator system(s) 130. Additionally, the spectator device(s) 150 may send indications of spectator input to the spectator system(s) 130. Game state information and spectator input information may be shared between the spectator device(s) 150 and the spectator system(s) 130 using any suitable mechanism, such as application program interfaces (APIs).

The spectator system(s) 130 may receive inputs or spectator viewpoints from the spectator device(s) 150 and update the game state information being sent to the spectator device(s) 150 for rendering online game content to spectator(s) 152. In this way, the spectator system(s) 130 may provide for spectating of the online game for spectator device(s) 150 including a spectator client that is capable rendering the spectator view from game state information.

In spectator setups involving spectator device(s) 150 that include a streaming media player that is capable of receiving and presenting a view rendered at the spectator system(s) 130 as a media stream and that may provide spectator input to the spectator system(s) 130, rather than receiving game state information from the one or more spectator system(s) 130, a spectator device 150 may receive a media stream corresponding to a view or viewpoint of the respective spectator 152. The media stream may be received repeatedly and/or continuously and/or as events of the online game transpire.

The spectator system(s) 130 may be configured to render content associated with the online game for respective spectator(s) 152 based at least on the game state information and a spectator viewpoint or spectator state of the respective spectator 152. More particularly, the spectator system(s) 130 may use the most recent game state information to render current events of the online game as content of a media stream. This content may include video, audio, haptic, combinations thereof, or the like content components.

As events transpire in the online game, the spectator system(s) 130 may receive updated game state information from the game system(s) 110 and render and send updated content of the media stream to the spectator device(s) 150. For example, if the spectator(s) 152 are spectating an online soccer game, and a player playing one of the goalies moves in a particular direction, then that movement and/or goalie location may be represented in the media stream content that may be sent to each of the spectator device(s) 150 for presentation to the spectator 152. In this way, the content of the online game is repeatedly updated throughout game play.

When the spectator device(s) 150 receive the updated media stream content from the spectator system(s) 130, a spectator device 150 may present the updated content associated with the online game to its respective spectator 152 via the streaming media player. This updated content may embody events that may have transpired since the previous state of the game (e.g., the movement of the goalie).

The spectator device(s) 150 may accept input from respective spectator(s) 152 via respective input device(s). The input from a spectator 152 may relate to the viewpoint or rendered view of the spectator and/or be responsive to events in the online game. For example, in an online basketball game, if a spectator 152 sees an event in the rendered content, such as a player trying to shoot a three-pointer, the spectator may desire to move the spectator's viewpoint back to allow the spectator to see the player and the goal. The intended change in viewpoint from the spectator 152, as captured via his/her input device, may be received by the spectator device 150 and sent to the spectator system(s) 130. The spectator system(s) 130 may change the view being rendered in accordance with the spectator's input.

The spectator device(s) 150 may be any suitable device, including, but not limited to a Sony Playstation® line of systems, a Nintendo Switch® line of systems, a Microsoft Xbox® line of systems, any gaming device manufactured by Sony, Microsoft, Nintendo, or Sega, an Intel-Architecture (IA)® based system, an Apple Macintosh® system, a notebook computer, a notebook computer, a desktop computer system, a set-top box system, a handheld system, a smartphone, a personal digital assistant, combinations thereof, or the like. In general, the spectator device(s) 150 may execute programs thereon to interact with the spectator system(s) 130 and display the media stream of the game content based at least in part on media stream received from the spectator system(s) 130. Additionally, the spectator device(s) 150 may send indications of spectator input to the spectator system(s) 130. Media stream data and spectator input information may be shared between the spectator device(s) 150 and the spectator system(s) 130 using any suitable mechanism, such as application program interfaces (APIs).

The spectator system(s) 130 may receive inputs or spectator viewpoints from the spectator device(s) 150 and update the rendering of the view or viewpoint of the spectator for the content of the media stream being sent to the spectator device(s) 150. In this way, the spectator system(s) 130 may provide for spectating of the online game for spectator device(s) 150 including a streaming media player that is capable all receiving and presenting to the spectator a view rendered at the spectator system(s) 130 as a media stream and may provide spectator input to the spectator system(s) 130.

While the above described spectator setups included interactive views that may have spectator states or viewpoints driven by input from the respective spectator 152, examples are not so limited. For example, the viewpoint of the spectator may be a chosen view. As discussed above, one example of a chosen view is a viewpoint that mirrors the view of a streaming game player. As mentioned above, in such a case, the spectator system(s) 130 may receive viewpoint, settings and/or input for the streaming game player and utilize that information to provide a rendered media stream to spectator device(s) 150. Another example chosen view may be a predefined view or viewpoint that is selected or chosen based on spectator input.

In addition, some examples may include limitations on spectator viewpoints, changes to views or other limitations on spectating (e.g., delayed viewing). For example, spectating may be limited or delayed in online games where an unfair advantage could be gained by a player having information from a spectator viewpoint (e.g., due to the player having another device operating as a spectator device or by information being relayed to the player by a spectator). Other variations would be apparent based on this disclosure.

The spectator system(s) 130 may further operate to provide a rebroadcast architecture that may instantiate additional spectator node(s) or server(s) to accommodate additional spectators 152. For example, when a current spectator node or server of the spectator system(s) 130 has reached a spectator capacity, an additional spectator node or server may be instantiated and a rebroadcast of the game state information may be established between a previously established spectator node or server and the newly instantiated spectator node or server. Such a rebroadcast architecture may be provided for any spectator setup (e.g., spectator setups including spectator clients rendering the view at the spectator device 150, spectator setups including media streaming from the spectator systems 130 to the spectator device 150, and so on).

The matchmaking system(s) 120 may operate with the game system(s) 110 and spectator system(s) 130 to connect spectator(s) 152 to online game(s) the spectator(s) 152 desire to spectate. The matchmaking system(s) 120 may receive an indication from the game system(s) 110 of spectator(s) 152 who wish to spectate an online game.

The matchmaking system(s) 120 may provide an interface for the spectator to find an online game to spectate from among online games in progress in the game system(s) 110. In addition or alternatively, spectator device 150 may provide the matchmaking system(s) 120 with an indication of an online game the spectator 152 wishes to spectate (e.g., a link posted by a streaming game player).

Having determined the online game the spectator 152 wishes to spectate, the matchmaking system(s) 120 may determine whether spectating is already enabled or instantiated for the online game. Of course, other examples may instantiate spectating for every online game and, thus, may exclude this operation. If spectating is not enabled or instantiated for the online game, the matchmaking system may request spectating be enabled and instantiated for the online game. More particularly, the matchmaking system(s) 120 may request the game system(s) 110 and/or spectator system(s) enable and/or instantiate a spectator node or server for the online game. When spectating is enabled and instantiated, the matchmaking system(s) 120 may provide connection information for the spectator device(s) 150 to the spectator system(s) 130 for addition of the spectator 152 to the spectator(s) of the online game. As discussed above, the spectator system(s) 130 may instantiate additional spectator node(s) or server(s) to accommodate additional spectators 152.

The matchmaking system(s) 120 and spectator system(s) 130 may further provide a platform for communication between the spectator(s) 152 spectating online games (e.g., the same game and/or different games). Depending on the implementation, the matchmaking system(s) 120 may provide a social platform in which spectator(s) 152 may utilize friends list, communities and/or groups, and other connections to establish relationships with other spectator(s) 152 and/or player(s) 142. The matchmaking system(s) 120 may also provide direct messaging, group messaging, public messaging, chat, and/or other communications functionality to allow spectator(s) 152 to communicate via the social platform.

In addition, the spectator system(s) 130 may include in-match communications functionality that may allow spectator(s) 152 to communicate with other spectator(s) 152 while spectating matches or instances of the online game. As mentioned above, the spectator system(s) 130 may provide an immersive virtual stadium spectating experience for spectator. This virtual stadium spectating experience may include simulated ambient voice communications among spectators located proximately in the virtual stadium. Other in-match communication options may be provided to spectators and are not limited to the examples discussed herein. Other options for in-match communication among spectators include spectator group communications and direct spectator to spectator communications.

Depending on the implementation, the in-match communications of the spectator(s) may or may not be available or presented to player(s) 142 and vice versa. For example, in the virtual stadium experience discussed above, player(s) 142 may also be able to hear the voice communications of the stadium spectators (e.g., cheering, booing, etc.) in a similar manner to a real world player of the same sports game. In another example, to prevent interference with the online game, spectator communications may not be presented to player(s) 142 in online games where player knowledge of the state of the game is limited (e.g., first person games). In such an example, player communications may or may not be blocked to spectators, depending on the risk of an unfair advantage being obtained through exploitation of the spectator system. Other variations would be apparent based on this disclosure.

Additional details regarding the architectures of the spectator system(s) 130 are illustrated in FIGS. 2-9 and discussed below.

Figure 2:
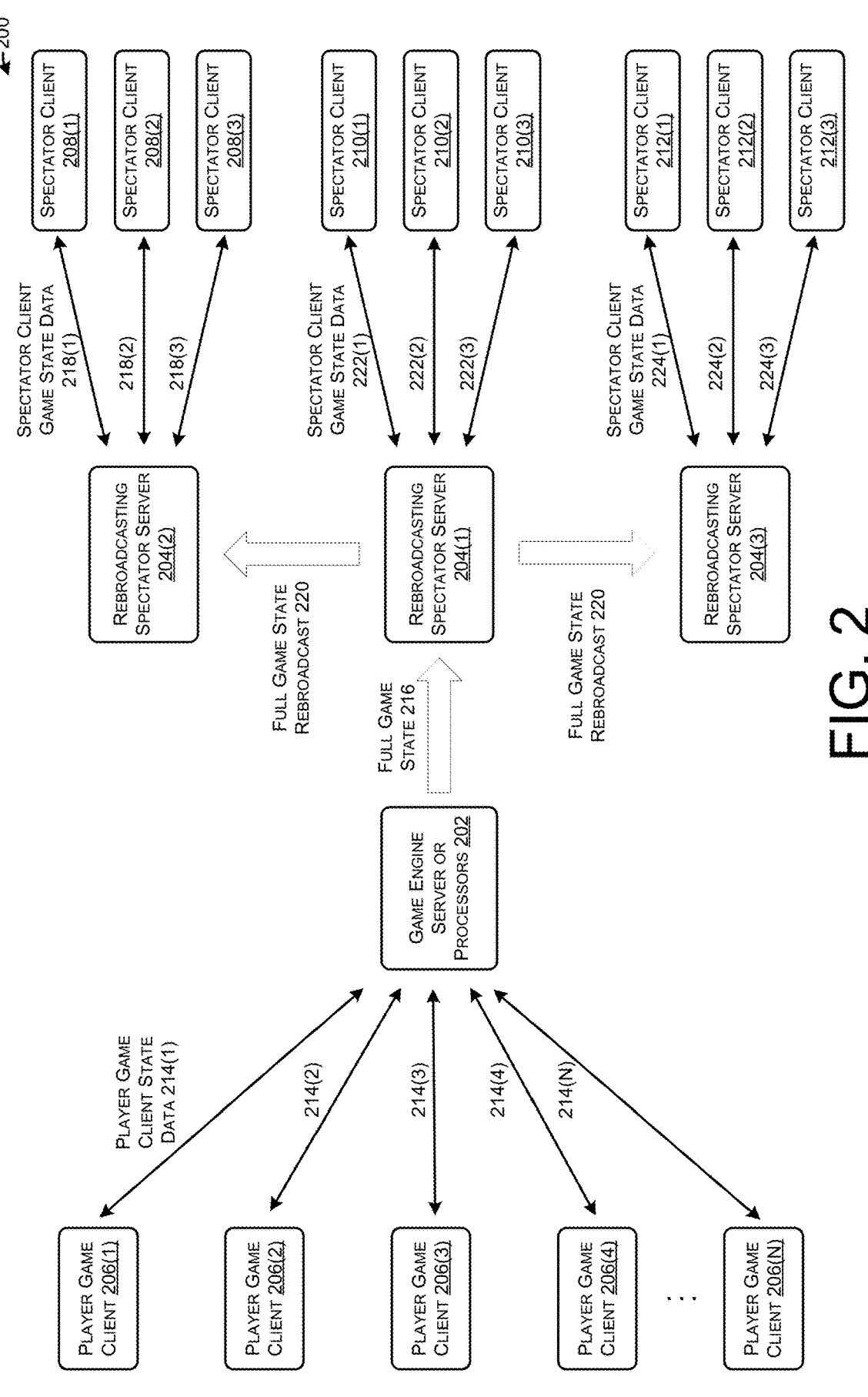
FIG. 2 illustrates an example block diagram of an example online game system that may provide for spectating of the online game via a rebroadcasting spectator server architecture, in accordance with example embodiments of the disclosure.

FIG. 2 illustrates an example block diagram 200 of an example online game system that may provide for spectating of the online game via a rebroadcasting spectator server architecture, in accordance with example embodiments of the disclosure. The example online game system(s) may include a game engine server or processors 202 (hereinafter game engine server 202), rebroadcasting spectator server(s) 204(1)-(3), player game client(s) 206(1)-(N), and spectator clients 208(1)-(3), 210(1)-(3) and 212(1)-(3). The example online game system(s) may operate an online game for player(s) of the player game client(s) 206(1)-(N) that may be spectated by spectators of the spectator clients 208(1)-(3), 210(1)-(3) and 212(1)-(3). The illustrated online game system of FIG. 2 may be an example implementation of the systems shown in FIG. 1.

In operation, the game engine server 202 may operate to host an online game between players associated with the player game client(s) 206. More particularly, the game engine server 202 may perform the game simulation functionality of the online game. During operation, the game engine server 202 and player game client(s) 206 may repeatedly and/or continuously exchange player game client state data 214. The player game client state data 214 may include game state information provided by the game engine server 202 to the player game client(s) 206 and player input provided by the player game client(s) 206 to the game engine server 202. Such exchanges may be performed as discussed above for game system(s) 110 and game client device(s) 140. In this way, the game engine server 202 may host the online game between the players associated with player game client(s) 206.

Once the online game has been instantiated, spectators may begin spectating the online game. In operations, the game engine server 202 may send the full game state 216 to a rebroadcasting spectator server 204 (e.g., 204(1)). In some implementations, the rebroadcasting spectator server 204(1) may be initialized when the online game is instantiated. Alternatively or additionally, the initialization of the rebroadcasting spectator server 204 and the sending of the full game state 216 to the rebroadcasting spectator server 204(1) from the game engine server 202 may be performed in response to a spectator or spectator(s) requesting to spectate the online game. Other variations are possible. For example, the game engine server may provide spectating functionality for a threshold number of spectators. Once more than the threshold number of spectators have requested to spectate the online game, the rebroadcasting spectator server 204(1) may be instantiated and the game engine server 202 may transfer the existing spectators to the rebroadcasting spectator server 204(1) and begin the sending of the full game state 216 to the rebroadcasting spectator server 204(1). Alternatively, once more than the threshold number of spectators have requested to spectate the online game, the rebroadcasting spectator server 204(1) may be instantiated and the game engine server 202 may begin the sending of the full game state 216 to the rebroadcasting spectator server 204(1) but the game engine server 202 may continue to service one or more of the existing spectators while transfer new spectators to the rebroadcasting spectator server 204(1).

The rebroadcasting spectator servers 204 may operate to facilitate spectating for a threshold number of spectators based on the full game state 216. More particularly, the rebroadcasting spectator server(s) 204 may repeatedly and/or continuously exchange spectator client game state data 218, 222 or 224 with the spectator client(s) 208, 210 or 212. The spectator client game state data 218, 222 or 224 may include game state information provided by the rebroadcasting spectator server 204 to the spectator client(s) 208, 210 or 212 and player input or spectator view or viewpoint data provided by the spectator client(s) 208, 210 or 212 to the rebroadcasting spectator server 204. Such exchanges may be performed as discussed above for spectator system(s) 130 and spectator device(s) 150. In this way, the rebroadcasting spectator server(s) 204 may facilitate spectating of the online game for spectators utilizing spectator clients capable of rendering the spectator view from game state information.

When a new spectator requests to spectate an online game, the spectator system may determine whether the existing rebroadcasting spectator servers 204 have an available slot or slots for the new spectator. When a slot is determined to not be available for the new spectator, another rebroadcasting spectator server 204 (e.g. rebroadcasting spectator servers 204(2) or 204(3)) may be instantiated. An existing rebroadcasting spectator server (e.g., 204(1)) may begin a full game state rebroadcast 220 to the subsequently initialized rebroadcasting spectator server (e.g. rebroadcasting spectator servers 204(2) or 204(3)). The new spectator may then be transferred to the additional rebroadcasting spectator server 204. The additional rebroadcasting server 204 may provide for spectating in the same or a similar manner to that discussed above. Though not shown, the full game state rebroadcast 220 may be established between any rebroadcasting spectator server 204 and the additional rebroadcasting spectator server 204. For example, after rebroadcasting spectator server 204(1) has established a full game state rebroadcast 220 with both rebroadcasting spectator servers 204(2) and 204(3), the full game state rebroadcast 220 for a fourth rebroadcasting spectator server 204 may be sourced from rebroadcasting spectator server 204(2). The determination of the existing rebroadcasting spectator server 204 from which to source the full game state rebroadcast 220 may be based on a threshold, a load-balancing algorithm or so on. Other implementation details may vary. For example, the establishment of an additional rebroadcasting spectator server 204 may be in response to the assignment of a new spectator to an available slot and a determination that limited remaining slots are available (e.g., rather than in response to a determination that a slot is not available). In particular, an additional rebroadcasting spectator server 204 may be instantiated in response to the assignment of a new spectator to the final available slot in the existing rebroadcasting spectator servers 204.

Depending on the implementation, the management of the assignment of spectators to rebroadcasting spectator servers 204 and the establishment of full game state rebroadcasts 220 may be handled by various devices. For example, a primary rebroadcasting spectator server 204 (e.g., 204(1)) may receive and maintain status information for subsequently instantiated rebroadcasting spectator server(s) 204. The primary rebroadcasting spectator server 204 may receive information related to the new spectator from the matchmaking system 120 and assign the new spectator to an existing rebroadcasting spectator server 204 or instantiate a new rebroadcasting spectator server 204 and assign the spectator to the new rebroadcasting spectator server 204. As mentioned above, other devices or systems of the online game system may manage the assignment of spectators and the instantiation of new rebroadcasting spectator servers 204. For example, such management may be handled by a dedicated management server of the spectator system, the game engine server 202, the matchmaking system 120 and so on.

Figure 3:
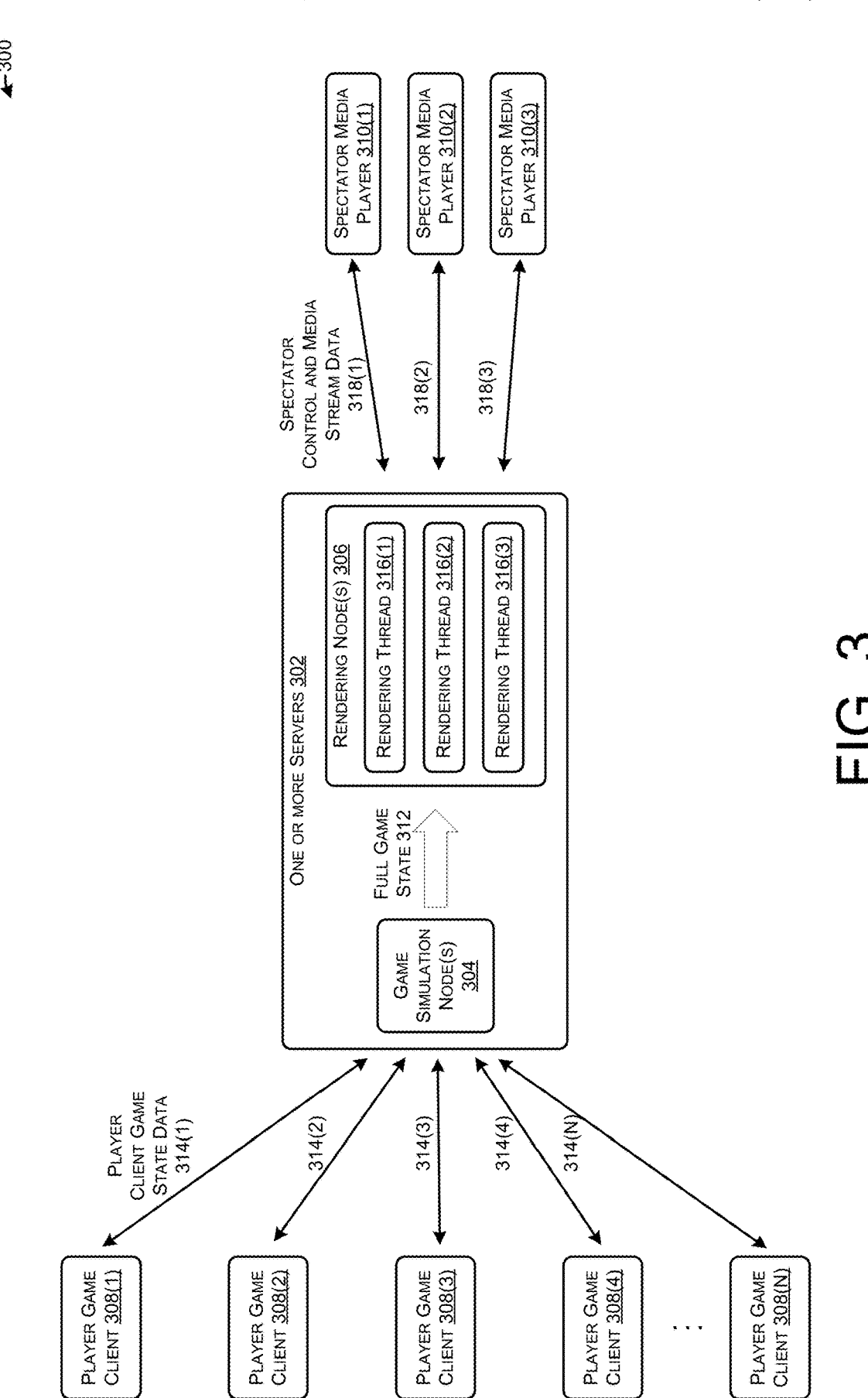
FIG. 3 illustrates an example block diagram of an example online game system that may provide for spectating of the online game for spectator device(s) that include a streaming media player that is capable of receiving and presenting to the spectator a view rendered at the spectator system(s) as a media stream, in accordance with example embodiments of the disclosure.

FIG. 3 illustrates an example block diagram 300 of an example online game system that may provide for spectating of the online game for spectator device(s) that include a streaming media player that is capable of receiving and presenting to the spectator a view rendered at the spectator system(s) as a media stream, in accordance with example embodiments of the disclosure. More particularly, the spectator device(s) of FIG. 3 may not include a client capable of rendering the spectator view based on game state information. Further, the example online game system of FIG. 3 may be implemented with or without the rebroadcast architecture discussed above with respect to FIGS. 1 and 2. Examples that combine or may combine the functionality discussed with respect to FIGS. 2 and 3 are provided below with respect to FIGS. 4-9. The example online game system(s) of FIG. 3 may include one or more servers 302 including one or more game simulation node(s) 304 and one or more rendering node(s) 306, player game client(s) 308(1)-(N), and spectator media players 310(1)-(3). The example online game system(s) may operate an online game for player(s) of the player game client(s) 308(1)-(N) that may be spectated by spectators of the spectator media players 310(1)-(3). The illustrated online game system of FIG. 3 may be an example implementation of the systems shown in FIG. 1.

The game simulation node(s) 304 and rendering node(s) 306 may include one or more processors (e.g., CPUs and/or GPUs) and may execute computer executable instructions of a game engine. More particularly, the game simulation node(s) 304 may perform a game simulation function to host the online game for the players of the player game client(s) 308(1)-(N). This may be performed in the manner discussed above with respect to FIGS. 1-2 and may include the repeated and/or continuous exchange of player game client state data 314(1)-314(N). Further, the game simulation node(s) 304 may send the full game state 312 to the rendering node(s) 306 for use in providing for spectating of the online game. In some examples, the game simulation node 304 may include a particular server 302 performing the functionality of the game simulation node 304 for the online game which may provide the full game state to one or more servers performing the functionality of the rendering node(s) 306. In some examples, the game simulation node 304 may include a particular processor performing the functionality of the game simulation node 304 for the online game which may provide the full game state to a plurality of processors (e.g., CPUs and/or GPUs) of one or more servers 302 performing the functionality of the rendering node(s) 306. The operations for instantiating an online game may be the same or similar to those discussed above and, to avoid prolix, discussion thereof will not be repeated here.

The rendering node(s) 306 may perform a rendering function of the game engine. In some examples, an individual spectator view of a spectator may be rendered by a corresponding rendering thread 316 operating in the rendering node(s) 306. Depending on the implementation, the rendering threads 316 may operate on corresponding rendering node(s) 306 including one or more CPUs and/or GPUs, multiple rendering threads 316 may operate on an individual rendering node(s) 306 (e.g., through time-based sharing of the one or more CPUs and/or GPUs) or some combination thereof. For example, a plurality of rendering threads 316 operating on a server 302 may have respective GPUs but share a CPU.

In operation, when a new spectator requests to spectate an online game, the rendering node(s) may instantiate a rendering thread 316 and establish a connection between the rendering thread 316 and the spectator media player 310 operating on a spectator device of the new spectator. More particularly, the connection between the rendering threads 316(1)-(3) and the spectator media players 310(1)-(3) may be used to exchange spectator control and media stream data 318(1)-(3). The spectator control and media stream data 318 may be exchanged repeatedly and/or continuously and/or as events of the online game transpire.

The rendering thread 316 may execute instructions configured to render content associated with the online game for the spectator(s). More particularly, the rendering thread 316 may use the full game state 312 and a spectator viewpoint or spectator state of the respective spectator to render current events of the online game as content of a media stream. This content may include video, audio, haptic, combinations thereof, or the like content components.

As events transpire in the online game, the rendering node(s) 306 may receive updates to the full game state 312 from the game simulation node(s) 304 and render and send updated content of the media stream to the spectator media players 310.

When the spectator media players 310 receive the updated media stream content from the rendering node(s) 306, a spectator media player 310 may present the updated content associated with the online game to its respective spectator. This updated content may embody events that may have transpired since the previous state of the game (e.g., the movement of the goalie).

The spectator media players 310 may accept input from respective spectator(s) via respective input device(s). The input from a spectator may relate to the viewpoint or rendered view of the spectator and/or be responsive to events in the online game. For example, in an online basketball game, if a spectator sees an event in the rendered content, such as a player trying to shoot a three-pointer, the spectator may desire to move the spectator's viewpoint back to allow the spectator to see the player and the goal. The intended change in viewpoint from the spectator, as captured via his/her input device, may be received by the spectator media player 310 and sent to the rendering thread 316. The rendering thread 316 may change the view being rendered in accordance with the spectator's input.

Figure 4:
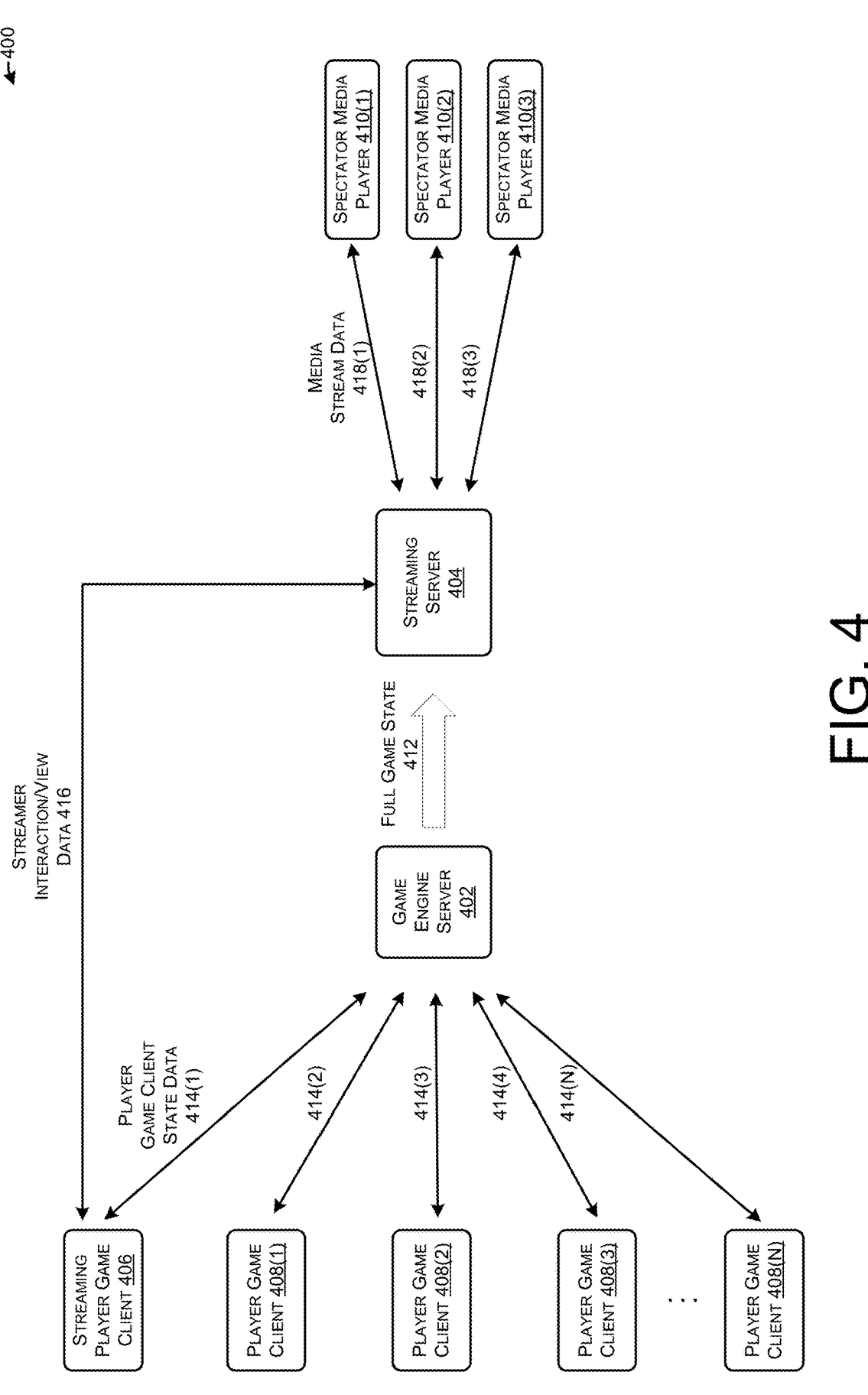
FIG. 4 illustrates an example block diagram of an example online game system that may provide for spectating of the online game for spectator device(s) that include a streaming media player that is capable of receiving and presenting to the spectator a view rendered at the spectator system(s) as a media stream, in accordance with example embodiments of the disclosure.

FIG. 4 illustrates an example block diagram 400 of an example online game system that may provide for spectating of the online game for spectator device(s) that include a streaming media player that is capable of receiving and presenting to the spectator a view rendered at the spectator system(s) as a media stream, in accordance with example embodiments of the disclosure. The example online game system(s) of FIG. 4 may include a game engine server 402, a streaming server 404, a streaming player game client 406, player game client(s) 408(1)-(N), and spectator media player(s) 410(1)-(3). The example online game system(s) may operate an online game for player(s) of the streaming player game client 406 and player game client(s) 408(1)-(N) that may be spectated by spectators of the spectator media players 410(1)-(3). More particularly, the example illustrated in FIG. 4 may relate to an implementation in which the spectator(s) of the spectator media players 410(1)-(3) desire to or have selected to spectate from the viewpoint of a streaming game player of the streaming player game client 406.

Further, the example online game system of FIG. 4 may operate in a similar manner to the example of the online game system of FIG. 3. For example, the game engine server 402, the streaming server 404, and the spectator media players 410 may operate in a similar manner or perform a similar function to the game simulation node(s) 304, the rendering node(s) 306 and the spectator media players 310, respectively. Similarly, the streaming player game client 406 and player game clients 408 may operate in a similar manner or perform a similar function to the player game clients 308. To avoid prolix, the discussion below relates to difference in operation between the example online game system of FIG. 4 and the example online game system of FIG. 3.

In operation, the streaming player of the streaming player game client 406 may request the online game system establish a spectator stream associated with the streaming player which may be rendered by the online gaming system for viewing by fans or viewers of the streaming player. Such a spectator stream from the online gaming system may be viewed as more official than a media stream generated at the streaming player's computing device and may provide reduced burden on the streaming player to produce streaming gameplay media for viewers. The fans or viewers of the streaming player may connect to the online game system and request to spectate the streaming player in the online game. In response, the online gaming system may connect the streaming media players 410 of the fans or viewers to the streaming server 404.

As events transpire in the online game, the streaming server 404 may receive updates to the full game state 412 from the game engine server 402 (e.g., based on the exchange of player game client state data 414(1)-414(N) with the game clients 406 and 408) as well as streamer interaction and/or view data 416 from the streaming player game client 406. In some examples, the view data of the streamer interaction and/or view data 416 may contain configuration information for the presentation of the streaming player's media stream (e.g., visual or audio additions to the media stream).

Based on the full game state 412 and the streamer interaction and/or view data 416, the streaming server may render and send updated content of the media stream 418 (1)-418(3) to the spectator media players 410(1)-410(3). In this manner, the spectators of the spectator media players 410 may spectate the online game from the point of view and/or in accordance with settings provided by the streaming player of the streaming player game client 406.

Figure 5:
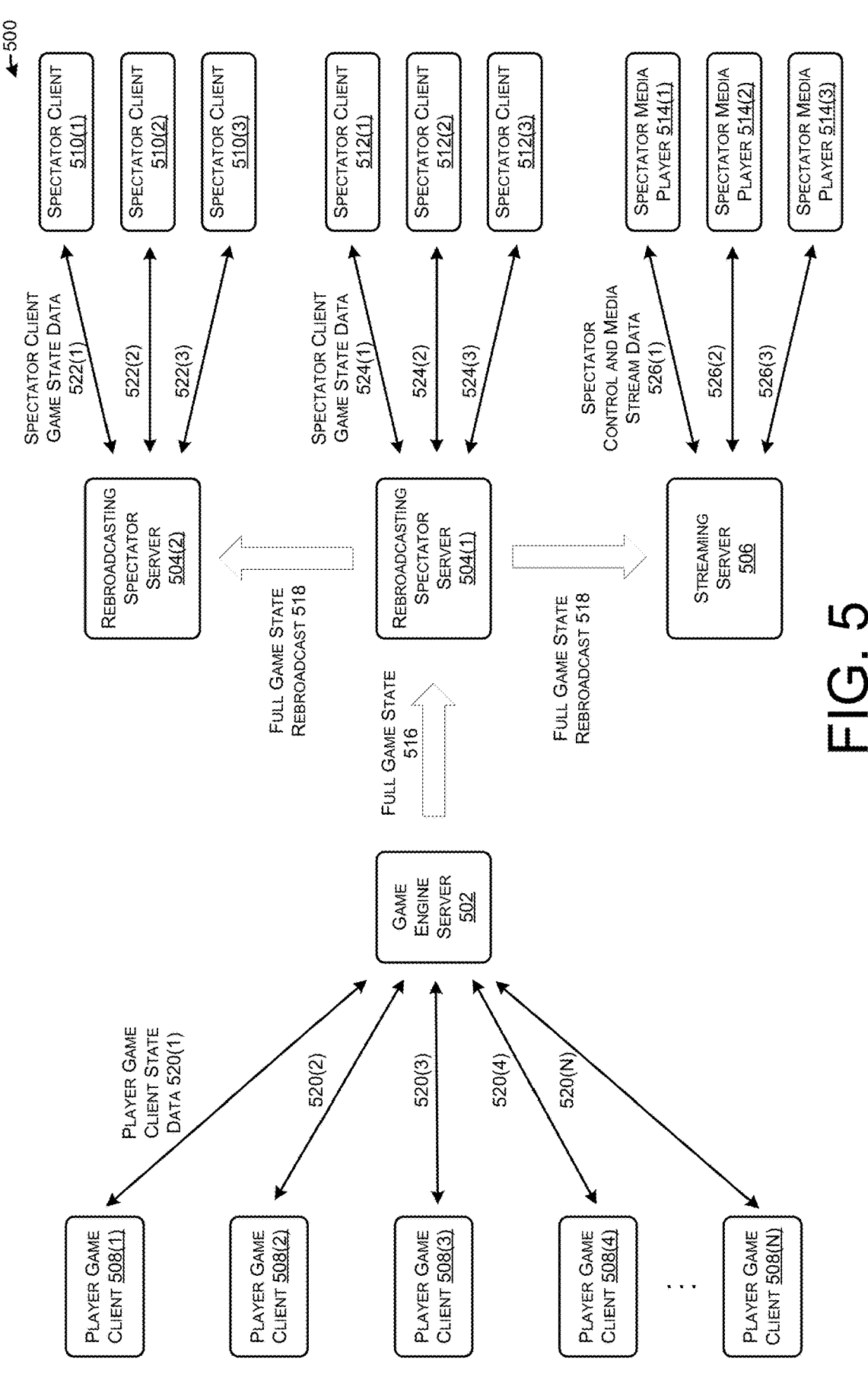
FIG. 5 illustrates an example block diagram of an example online game system that may provide for spectating of the online game for spectators, in accordance with example embodiments of the disclosure.

FIG. 5 illustrates an example block diagram 500 of an example online game system that may provide for spectating of the online game for spectators in accordance with example embodiments of the disclosure. The example online game system(s) of FIG. 5 may include a game engine server 502, rebroadcasting spectator servers 504(1) and 504(2), a streaming server 506, player game client(s) 508(1)-(N), spectator client(s) 510(1)-(3) and 512(1)-(3) and spectator media player(s) 514(1)-(3). The example online game system(s) may operate an online game for player(s) of the player game client(s) 508(1)-(N) that may be spectated by spectators of the spectator client(s) 510(1)-(3) and 512(1)-(3) and spectator media player(s) 514(1)-(3). More particularly, the example illustrated in FIG. 4 may relate to an implementation that may provide the rebroadcasting functionality discussed above with regard to FIGS. 1 and 2 and the server rendering of spectator views discussed above with respect to FIGS. 1, 3 and 4.

More particularly, the example online game system of FIG. 5 may operate in a similar manner to the example of the online game systems of FIGS. 2-4. For example, (1) the game engine server 502, (2) the rebroadcasting spectator servers 504(1) and 504(2) and the streaming server 506, (3) player game clients 508, (4) spectator client(s) 510(1)-(3) and 512(1)-(3) and (5) spectator media player(s) 514(1)-(3) may operate in a similar manner or perform a similar functions to the (1) game engine server 202 and game simulation node(s) 304, (2) the rebroadcasting spectator servers 204 and rendering node(s) 306, (3) the player game clients 206 and player game clients 308, (4) the spectator clients 208-212 and (5) the spectator media players 310, respectively. To avoid prolix, the discussion below relates to difference in operation between the example online game system of FIG. 5 and the example online game systems of FIGS. 2 and 3.

Specifically, in the same or a similar manner to that discussed above, the game engine server 502 may operate to provide the full game state 516 to the rebroadcasting spectator server 504(1) repeatedly and/or continuously during gameplay based at least in part on exchanges of player game client state data 520(1)-520(N) with the player game clients 508. The rebroadcasting servers 504 may repeatedly and/or continuously exchange spectator client game state data 522(1)-(3) and 524(1)-(3) with the spectator clients 510 and 512 during gameplay to allow the spectator clients 510 and 512 to render and display spectator views to the associated spectators. Further, the streaming server 506 may operate in a similar manner to that discussed above for the rendering node(s) to render views that may be presented to spectators by the streaming media players 514.

In addition to the previously described functionality referenced above, when a new spectator requests to spectate the online game in the online game system of FIG. 5, the spectator system may determine whether the spectator is using a spectator client capable of rendering views for spectating or a spectator media player for which the spectator system may render the views for spectating. In the case of a spectator using a spectator client, the system may operate as discussed above for FIG. 2. In the case of a spectator using a streaming media player that is capable of receiving and presenting a view rendered at the spectator system(s) as a media stream, the spectator system (e.g., rebroadcasting spectator server 504(1)) may determine if a streaming server has been instantiated and, if so, whether the streaming server has an available slot or slots for the new spectator. If not in either case, the spectator system may instantiate a streaming server 506, establish a full game state rebroadcast 518 of the full game state 516 to the new streaming server 506, and transfer the new spectator's streaming media player's 514 connection information to the new streaming server 506. The new streaming server 506 may then provide for spectating via the spectator media player 514 by exchanging spectator control and media stream data 526 with the spectator media player 514.

While the above described examples separated the functionality of the rebroadcasting server 504 and streaming servers 506, this is shown for case of illustration and explanation and examples are not so limited. For example, some systems according to this disclosure may include rebroadcasting spectator servers that may handle both spectators using spectator clients and spectators using streaming media players. In such examples, a load balancer or other processing resource management algorithm may be utilized to determine whether the existing rebroadcasting spectator servers have reached a spectator capacity and additional rebroadcasting spectator servers should be instantiated for new spectators (e.g., based on whether existing rebroadcasting spectator servers have enough free resources).

Moreover, the above-described examples are merely exemplary and many variations and alternatives will be apparent to one of ordinary skill in the art in view of this disclosure. For example, the online gaming system of FIG. 5 may further incorporate functionality such as that discussed above with regard to FIG. 4 to allow for streaming game players to provide a media stream for spectating by fans or viewers of the streaming game player.

Figure 6:
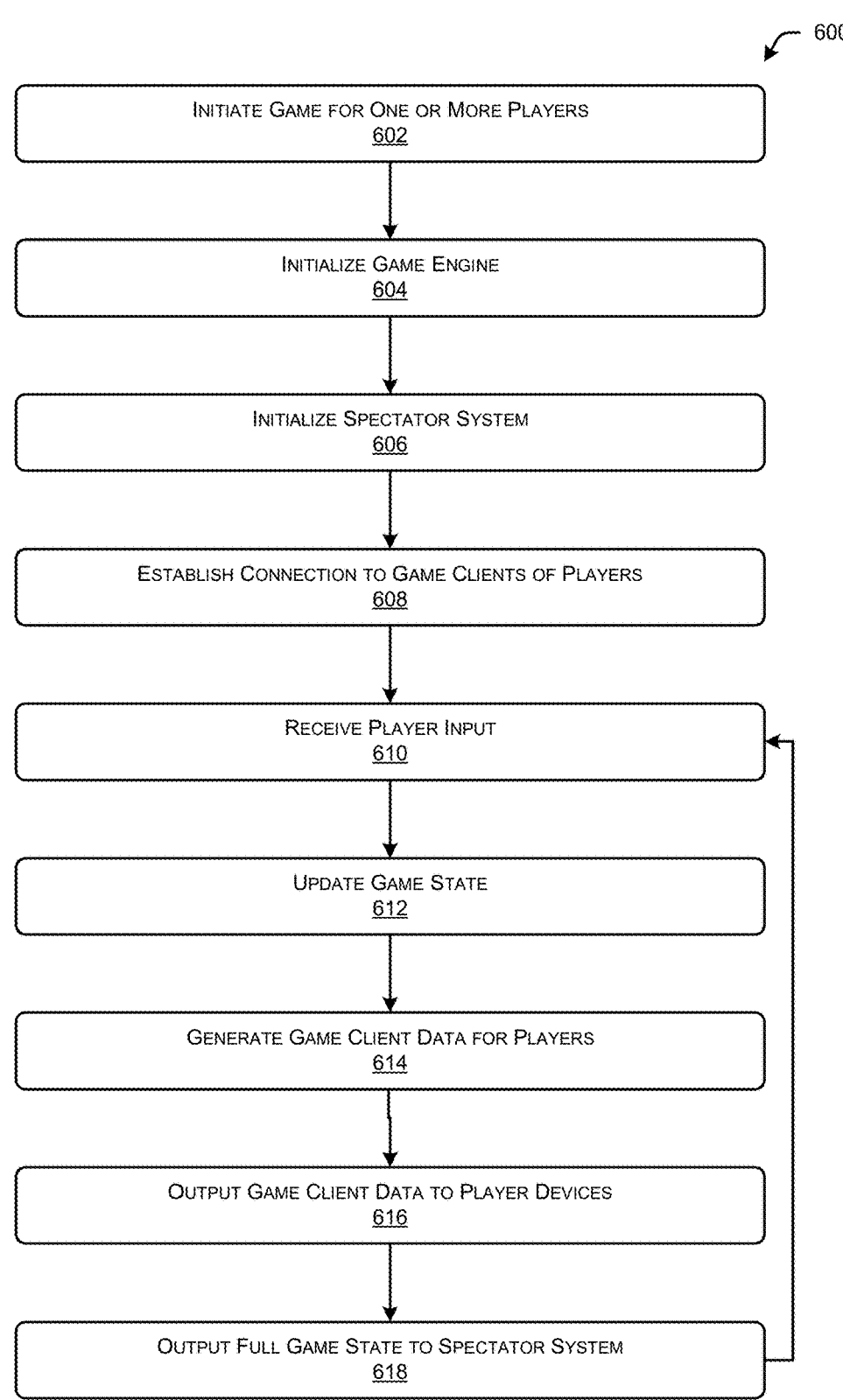
FIG. 6 illustrates an example flow diagram of an example method that may provide for accommodating spectators in online gaming, in accordance with example embodiments of the disclosure.

FIG. 6 illustrates a flow diagram of an example method 600 that may provide for accommodating spectators in online gaming, in accordance with example embodiments of the disclosure. The method 600 may be performed by the online gaming system of the environment 100. More particularly, the method 600 may relate to the operations of a game system to initialize and host an online game that accommodates spectating by spectators.

At block 602, the online game system may initiate a game for one or more players. A game engine server may initialize the game engine of the online game to be played by the one or more players at 604. Further, a spectator system (e.g., a rebroadcasting spectator server) may be initialized for the online game at 606. The game engine server may establish connections with game clients associated with the one or more players at 608 to begin the game.

During gameplay, the game engine server may receive player input from the one or more players via the player game clients at 610. At 612, the game engine server may utilize the player input to update the game state of the online game. The game engine server may generate game client data for the players at 614. As mentioned above, in some examples, the game client data generated for an individual player may be based on the state of the player in the game (e.g., based on the player's location or other factors). The game client data for the players may be output to the game clients operating on the player devices at 616. Then, at 618, the full game state may be output to the spectator system.

The process illustrated in FIG. 6 may continue during the online game in conjunction with the operations shown in FIGS. 7-9.

FIG. 7 illustrates a flow diagram of an example method 700 that may provide for accommodating spectators in online gaming, in accordance with example embodiments of the disclosure. The method 700 may be performed by the spectator system(s) 130 of the environment 100 and the spectator system of FIG. 5. More particularly, the method 700 may relate to the operations of a spectator system that accommodates spectating of an online game by spectators using spectator clients capable of rendering views for spectating and spectators using a spectator media player for which the spectator system may render the views for spectating. Method 700 may occur after method 600 or similar operations have occurred to initialize the spectator system and establish a connection by which the game engine server provides the spectator system with the full game state.

At 702, the spectator system may receive an additional spectator. For example, the spectator system may receive a request from the spectator to spectate the online game. At 704, the spectator system may determine the type of spectator (e.g., a spectator using a spectator client capable of rendering views for spectating or a spectator using a spectator media player for which the spectator system may render the views for spectating). If the spectator is using an interactive media player, the process proceeds to 706. Otherwise, if the spectator is using a spectator client, the process proceeds to 708.

At 706, the spectator is transferred to a current interactive media player spectator server (e.g., if one has been instantiated) and the process continues to 802 in FIG. 8. Though not shown, if no interactive media player spectator server has been instantiated, the process may instead proceed to 806 directly for instantiation of an additional interactive media player spectator server as discussed below.

Returning to 708 (e.g., based on a determination the spectator is using a spectator client at 704), the spectator is transferred to a current game client spectator server (e.g., if one has been instantiated) and the process continues to 902 in FIG. 9. Though not shown, if no game client spectator server has been instantiated, the process may instead proceed to 906 directly for instantiation of an additional game client spectator server as discussed below.

FIG. 8 illustrates a flow diagram of an example method 800 that may provide for accommodating spectators using an spectator media player to spectate in online gaming, in accordance with example embodiments of the disclosure. The method 800 may be performed by the spectator system(s) 130 of the environment 100 and the spectator system of FIG. 5. More particularly, the method 800 may relate to the operations of a streaming server that accommodates spectating of an online game by spectators using a spectator media player for which the spectator system may render the views for spectating.

At 802 (which may be reached from FIG. 7 or from block 822), the spectator system may determine whether the current interactive media spectator server(s) have remaining slots available to accommodate the additional spectator. If so, the process may continue to 804. Otherwise, the process may continue to 806.

At 804, the current interactive media spectator server may establish a connection with the media player of the additional spectator. The current interactive media spectator server may then initialize a renderer thread for the spectator view to be displayed to the additional spectator at 808.

At 810, the current interactive media spectator server may generate a media stream including the spectator view of the additional spectator (e.g., based on the most recent version of the full game state and the current view or viewpoint of the spectator). As discussed above, the full game state may be received by the interactive media spectator server from the game engine server or from another interactive media spectator server or rebroadcasting spectator server. The view or viewpoint of the spectator may have a default initial state and may be updated based on spectator input.

At 812, the current interactive media spectator server may output the media stream of the spectator view to the spectator media player of the additional spectator.

At 814, the current interactive media spectator server may receive an updated full game state from the game engine server. Additionally, at 816, the current interactive media spectator server may receive input of the additional spectator (e.g., from the spectator media player of the additional spectator). At 818, the current interactive media spectator server may update the spectator view or viewpoint based on the input. For example, the additional spectator may provide an input to move a camera position. The current interactive media spectator server may update the camera position based on the input. The process may then return to 810.

Returning to 806 (e.g., based on a determination that the current interactive media spectator server(s) cannot accommodate an additional spectator), the spectator system may establish an additional interactive media spectator server. At 820, the spectator system may establish a rebroadcast of the full game state to the additional interactive media spectator server. As discussed above, the rebroadcast of the full game state may be established from the game system, an existing interactive media spectator server and/or an existing rebroadcasting spectator server (e.g., depending on resource availability). At 822, the additional spectator may then be redirected or transferred to the additional interactive media spectator server. The process may then continue to 802 on the new interactive media spectator server.

FIG. 9 illustrates a flow diagram of an example method 900 that may provide for accommodating spectators using a spectator client to spectate in online gaming, in accordance with example embodiments of the disclosure. The method 900 may be performed by the spectator system(s) 130 of the environment 100 and the spectator system of FIG. 5. More particularly, the method 900 may relate to the operations of a rebroadcasting spectator server that accommodates spectating of an online game by spectators using a game client or spectator client that is capable of rendering the view for the spectator.

At 902 (which may be reached from FIG. 7 or from block 918), the spectator system may determine whether the current game client spectator server(s) have remaining slots available to accommodate the additional spectator. If so, the process may continue to 904. Otherwise, the process may continue to 906.

At 904, the current game client spectator server may establish a connection with the spectator client of the additional spectator. At 908, the current game client spectator server may then receive a spectator state from the spectator client of the additional spectator (e.g., a view or viewpoint of the spectator in the online game).

At 910, the current game client spectator server may generate game client data for the additional spectator (e.g., based on the most recent version of the full game state and the current spectator state of the spectator). As discussed above, the full game state may be received by the game client spectator server from the game engine server or from an interactive media spectator server or another game client spectator server. The spectator state of the spectator may have a default initial state before being updated by the game client and provided to the current game client spectator server.

At 912, the current game client spectator server may output the game client data to the spectator client of the additional spectator. Then, at 914, the current game client spectator server may receive an updated full game state from the game engine server.

Returning to 906 (e.g., based on a determination that the current game client spectator server(s) cannot accommodate an additional spectator), the spectator system may establish an additional game client spectator server. At 916, the spectator system may establish a rebroadcast of the full game state to the additional game client spectator server. As discussed above, the rebroadcast of the full game state may be established from the game system, an existing interactive media spectator server and/or an existing game client spectator server (e.g., depending on resource availability). At 918, the additional spectator may then be redirected or transferred to the additional game client spectator server. The process may then continue to 902 on the new game client spectator server.

It should be noted that some of the operations of methods 600-900 may be performed out of the order presented, with additional elements, and/or without some elements. Some of the operations of methods 600-900 may further take place substantially concurrently and, therefore, may conclude in an order different from the order of operations shown above.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and are believed to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

Figure 10:
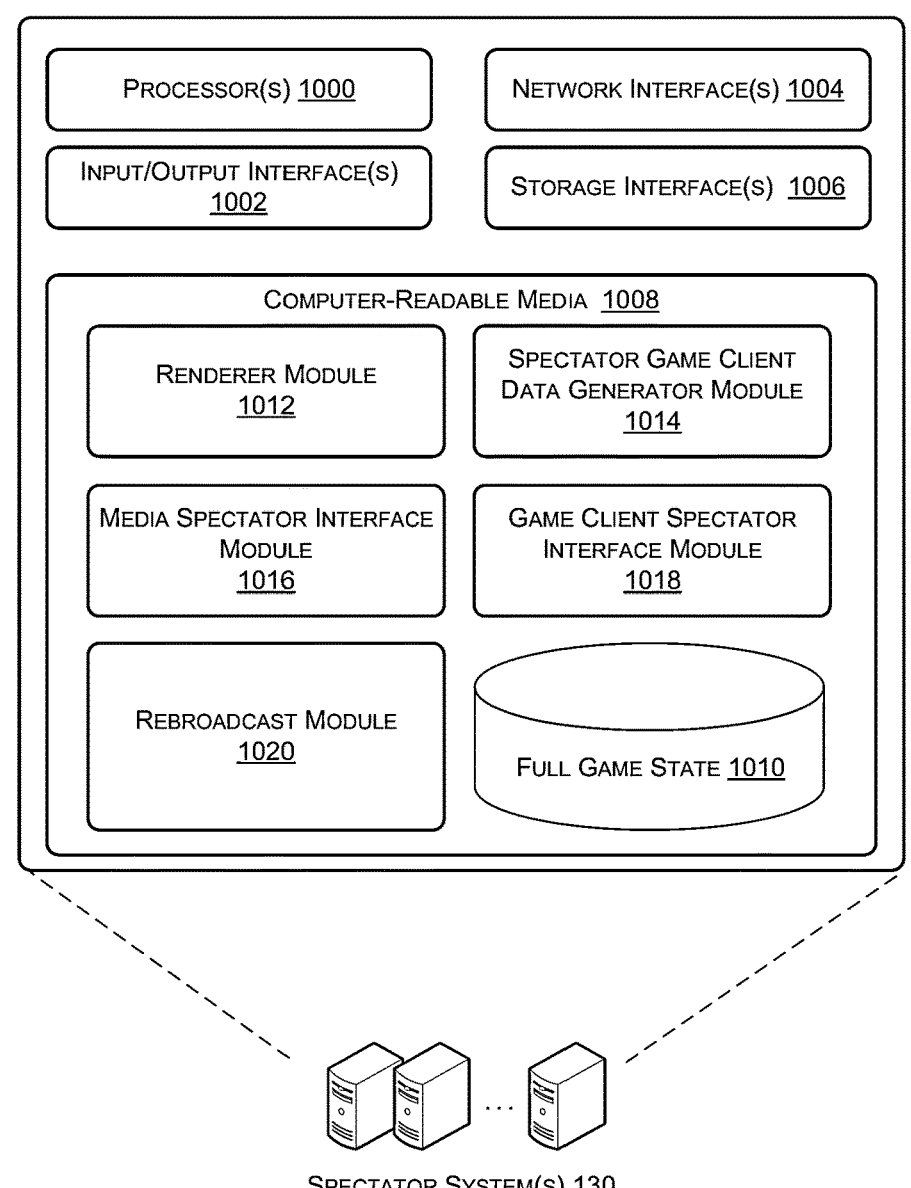
FIG. 10 illustrates a block diagram of example spectator system(s) that may provide for spectating in online games in accordance with example embodiments of the disclosure.

FIG. 10 illustrates a block diagram of example spectator system(s) 130 that may provide for spectating in online games in accordance with example embodiments of the disclosure. The spectating system(s) 130 may include one or more processor(s) 1000, one or more input/output (I/O) interface(s) 1002, one or more network interface(s) 1004, one or more storage interface(s) 1006, and computer-readable media 1008.

In some implementations, the processor(s) 1000 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 1000 may possess its own local memory, which also may store program modules, program data, and/or one or more operating system(s). The one or more processor(s) 1000 may include one or more cores.

The one or more input/output (I/O) interface(s) 1002 may enable the spectator system(s) 130 to detect interaction with a user and/or other system(s), such as one or more game system(s) 110. The I/O interface(s) 1002 may include a combination of hardware, software, and/or firmware and may include software drivers for enabling the operation of any variety of I/O device(s) integrated on the spectator system(s) 130 or with which the spectator system(s) 130 interacts, such as displays, microphones, speakers, cameras, switches, and any other variety of sensors, or the like.

The network interface(s) 1004 may enable the spectator system(s) 130 to communicate via the one or more network(s). The network interface(s) 1004 may include a combination of hardware, software, and/or firmware and may include software drivers for enabling any variety of protocol-based communications, and any variety of wireline and/or wireless ports/antennas. For example, the network interface(s) 1004 may comprise one or more of a cellular radio, a wireless (e.g., IEEE 1002.1x-based) interface, a Bluetooth® interface, and the like. In some embodiments, the network interface(s) 1004 may include radio frequency (RF) circuitry that allows the spectator system(s) 130 to transition between various standards. The network interface(s) 1004 may further enable the spectator system(s) 130 to communicate over circuit-switch domains and/or packet-switch domains.

The storage interface(s) 1006 may enable the processor(s) 1000 to interface and exchange data with the computer-readable medium 1008, as well as any storage device(s) external to the spectator system(s) 130.

The computer-readable media 1008 may include volatile and/or nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 1008 may be implemented as computer-readable storage media (CRSM), which may be any available physical media accessible by the processor(s) 1000 to execute instructions stored on the computer readable media 1008. In one basic implementation, CRSM may include RAM and Flash memory. In other implementations, CRSM may include, but is not limited to, ROM, EEPROM, or any other tangible medium which can be used to store the desired information and which can be accessed by the processor(s) 1000. The computer-readable media 1008 may have an operating system (OS) and/or a variety of suitable applications stored thereon. The OS, when executed by the processor(s) 1000 may enable management of hardware and/or software resources of the spectator system(s) 130.

Several functional blocks having instruction, data stores, and so forth may be stored within the computer-readable media 1008 and configured to execute on the processor(s) 1000. The computer readable media 1008 may have stored thereon the full game state 1010, a renderer module 1012, a spectator client generator module 1014, a media spectator interface module 1016, a game client spectator interface module 1018, and a rebroadcast module 1020. It will be appreciated that each of the functional blocks 1012-1020 may have instructions stored therein that, when executed by the processor(s) 1000, may enable various functions pertaining to the operations of the spectator system(s) 130.

For example, the renderer module 1012 may enable various functions related to the rendering nodes and rendering threads, for example, with respect to rendering a media stream of a spectator's view. The media spectator interface module 1016 may enable various functions with respect to interfacing and exchanging data with a spectator media player and/or to establishing interactive media spectator servers. Similarly, the spectator client generator module 1014 may enable various functions related to the rebroadcasting spectator servers, for example, with respect to generating game client data for a spectator. The game client spectator interface module 1018 may enable various functions with respect to interfacing and exchanging data with a spectator client and/or to establishing game client spectator servers. The rebroadcast module 1020 may enable various functions related to the rebroadcast architecture for rebroadcasting the full game state 1010 between servers of the spectator system as discussed above.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:

one or more processors; and one or more non-transitory computer-readable media storing computer-executable instructions that, when executed by the one or more processors, cause the one or more processors to:

receive, at a spectator server, game state data from a game simulation server hosting an online game for one or more players;

generate, by the spectator server, one or more spectator game state data corresponding to one or more spectator devices;

output, by the spectator server and based at least in part on a type of spectator associated with the one or more spectator devices, the one or more spectator game state data to the one or more spectator devices; and output, by the spectator server, the game state data to another spectator server, wherein the other spectator server is configured to output one or more second spectator game state data based on the game state data and based at least in part on the type of spectator associated with one or more second spectator devices to the one or more second spectator devices;

wherein the type of spectator comprises at least:

a first spectator type associated with a spectator client capable of rendering views on the spectator device; and a second spectator type associated with a spectator media player for which the spectator server or the other spectator server renders views for spectating.

2. The system of claim 1, wherein the game state data includes a full game state of the online game hosted by the game simulation server for the one or more players.

3. The system of claim 1, wherein the computer-executable instructions further cause the one or more processors to:

receive, by the spectator server, a request to spectate the online game from an additional spectator device, the request requesting to spectate via a media stream;

instantiate a new spectator server configured to render a media stream including a spectator view for the additional spectator device;

establish a rebroadcasting of the game state data from an existing spectator server of one or more existing spectator servers to the new spectator server; and transfer the additional spectator device to the new spectator server.

4. The system of claim 1, wherein the one or more players are hosted separately from the one or more spectator devices.

5. The system of claim 1, wherein the spectator view is further based on input received at the particular spectator device from a respective spectator.

6. The system of claim 1, wherein the computer-executable instructions further cause the one or more processors to:

determine a capacity of the spectator server; and rebroadcast the game state data from the spectator server to the other spectator server based at least in part on the capacity of the spectator server.

7. The system of claim 1, wherein the computer-executable instructions further cause the one or more processors to:

receive a request from an additional spectator device to spectate the online game;

determine whether the additional spectator device is associated with the first spectator type or the second spectator type; and send the additional spectator device to a particular spectator server configured to handle the first spectator type or the second spectator type.

8. A computer-implemented method comprising:

receiving, at a spectator server, game state data from a game simulation server hosting an online game for one or more players;

generating, by the spectator server, one or more spectator game state data corresponding to one or more spectator devices;

outputting, by the spectator server and based at least in part on a type of spectator associated with the one or more spectator devices, the one or more spectator game state data to the one or more spectator devices; and outputting, by the spectator server, the game state data to another spectator server, wherein the other spectator server is configured to output one or more second spectator game state data based on the game state data and based at least in part on the type of spectator associated with one or more second spectator devices to the one or more second spectator devices;

wherein the type of spectator comprises at least:

a first spectator type associated with a spectator client capable of rendering views on the spectator device; and a second spectator type associated with a spectator media player for which the spectator server or the other spectator server renders views for spectating.

9. The computer-implemented method of claim 8, wherein the game state data includes a full game state of the online game hosted by the game simulation server for the one or more players.

10. The computer-implemented method of claim 8, further comprising:

receiving, by the spectator server, a request to spectate the online game from an additional spectator device, the request requesting to spectate via a media stream;

instantiating a new spectator server configured to render a media stream including a spectator view for the additional spectator device;

establishing a rebroadcasting of the game state data from an existing spectator server of one or more existing spectator servers to the new spectator server; and transferring the additional spectator device to the new spectator server.

11. The computer-implemented method of claim 8, wherein the one or more players are hosted separately from the one or more spectator devices.

12. The computer-implemented method of claim 8, wherein a spectator game state data of the one or more spectator game state data is a subset or derived from the game state data received from the game simulation server.

13. The computer-implemented method of claim 8, wherein a particular spectator device of the one or more spectator devices includes the spectator client that renders a spectator view from spectator game state data.

14. The computer-implemented method of claim 13, wherein the spectator view is further based on input received at the particular spectator device from a respective spectator.

15. One or more non-transitory computer-readable media storing computer-executable instructions that, when executed by one or more processors, cause the one or more processors to perform operations comprising:

receiving, at a spectator server, game state data from a game simulation server hosting an online game for one or more players;

generating, by the spectator server, one or more spectator game state data corresponding to one or more spectator devices;

outputting, by the spectator server and based at least in part on a type of spectator associated with the one or more spectator devices, the one or more spectator game state data to the one or more spectator devices; and outputting, by the spectator server, the game state data to another spectator server, wherein the other spectator server is configured to output one or more second spectator game state data based on the game state data and based at least in part on the type of spectator associated with one or more second spectator devices to the one or more second spectator devices;

wherein the type of spectator comprises at least:

a first spectator type associated with a spectator client capable of rendering views on the spectator device; and a second spectator type associated with a spectator media player for which the spectator server or the other spectator server renders views for spectating.

16. The one or more non-transitory computer-readable media of claim 15, wherein the game state data includes a full game state of the online game hosted by the game simulation server for the one or more players.

17. The one or more non-transitory computer-readable media of claim 15, wherein a spectator game state data of the one or more spectator game state data is a subset or derived from the game state data received from the game simulation server.

18. The one or more non-transitory computer-readable media of claim 15, wherein a particular spectator device of the one or more spectator devices includes the spectator client that renders a spectator view from spectator game state data.

19. The one or more non-transitory computer-readable media of claim 18, wherein the spectator view is further based on input received at the particular spectator device from a respective spectator.

20. The one or more non-transitory computer-readable media of claim 15, wherein the one or more players are hosted separately from the one or more spectator devices.

* * * * *